(12) United States Patent  (10) Patent No.: US 8,619,036 B2
Mosby et al.                (45) Date of Patent:   *Dec. 31, 2013

(54) VIRTUAL KEYBOARD BASED ACTIVATION AND DISMISSAL

(71) Applicant: Microsoft Corporation, Redmond, WA (US)

(72) Inventors: Timothy J. Mosby, Seattle, WA (US); Christian N. Wiswell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,251

(22) Filed: Jan. 21, 2013

(65) Prior Publication Data

US 2013/0127729 A1   May 23, 2013

Related U.S. Application Data

(63) Continuation of application No. 12/050,171, filed on Mar. 18, 2008, now Pat. No. 8,358,277.

(51) Int. Cl.
G09G 5/00   (2006.01)

(52) U.S. Cl.
USPC ........... 345/168; 345/169; 345/172; 345/173; 345/174; 463/37; 715/773

(58) Field of Classification Search
USPC ............ 345/168, 169, 172, 173, 174; 463/37; 715/773
See application file for complete search history.

(56) References Cited

U.S. PATENT DOCUMENTS

| 5,374,787 A | 12/1994 | Miller et al. |
| 5,767,842 A | 6/1998 | Korth |
| 5,812,118 A | 9/1998 | Shieh |
| 6,359,572 B1 | 3/2002 | Vale |

(Continued)

FOREIGN PATENT DOCUMENTS

WO   2005076477 A1   8/2005

OTHER PUBLICATIONS

Kolsch, M. et al., "Keyboards without Keyboards: A Survey of Virtual Keyboards," UCSB Technical Report, Jul. 12, 2002, 8 pages.

(Continued)

Primary Examiner — Lun-Yi Lao
Assistant Examiner — Sosina Abebe
(74) Attorney, Agent, or Firm — Alleman Hall McCoy Russell & Tuttle LLP (57) ABSTRACT

A virtual keyboard apparatus and method for forming the virtual keyboard apparatus are provided. The virtual keyboard apparatus may include a touch-sensitive display surface configured to detect a touch signal including at least a finger touch and a palm touch by a hand of a user, and a controller configured to generate a virtual keyboard having a layout determined based at least in part on a distance between the detected palm touch and the detected finger touch. The method for generating a virtual keyboard may include detecting with a touch-sensitive display surface a touch signal including at least a finger touch and a palm touch formed by a hand of a user, and generating a virtual keyboard having a layout based at least in part on a distance between the detected palm touch and the detected finger touch.

19 Claims, 4 Drawing Sheets

(56) References Cited

U.S. PATENT DOCUMENTS

| | | | |
|---|---|---|---|
| 6,570,557 | B1 | 5/2003 | Westerman et al. |
| 6,573,844 | B1 | 6/2003 | Venolia et al. |
| 6,611,253 | B1 | 8/2003 | Cohen |
| 6,614,422 | B1 | 9/2003 | Rafii et al. |
| 7,161,579 | B2 | 1/2007 | Daniel |
| 7,170,428 | B2 | 1/2007 | Himberg et al. |
| 7,250,938 | B2 | 7/2007 | Kirkland et al. |
| 7,768,501 | B1 * | 8/2010 | Maddalozzo et al. ........ 345/173 |
| 2003/0011503 | A1 | 1/2003 | Levenson |
| 2003/0080945 | A1 | 5/2003 | Betts-LaCroix |
| 2003/0197687 | A1 | 10/2003 | Shetter |
| 2004/0046744 | A1 * | 3/2004 | Rafii et al. .................... 345/168 |
| 2004/0128012 | A1 | 7/2004 | Lin |
| 2005/0052406 | A1 * | 3/2005 | Stephanick et al. .......... 345/156 |
| 2005/0162402 | A1 | 7/2005 | Watanachote |
| 2005/0225538 | A1 * | 10/2005 | Verhaegh ...................... 345/173 |
| 2006/0033724 | A1 * | 2/2006 | Chaudhri et al. ............. 345/173 |
| 2006/0050062 | A1 * | 3/2006 | Ozawa et al. ................. 345/173 |
| 2006/0066590 | A1 | 3/2006 | Ozawa et al. |
| 2008/0136679 | A1 | 6/2008 | Newman et al. |

OTHER PUBLICATIONS

Malik, S. et al., "Visual Touchpad: A Two-handed Gestural Input Device," Proceedings of the 6th International Conference on Multimodal Interfaces, Oct. 2004, 8 pages.

Zhang, Z. et al., "Visual Panel: Virtual Mouse, Keyboard and 3D Controller with an Ordinary Piece of Paper," Proceedings of the 2001 Workshop on Perceptive User Interfaces, Nov. 14, 2001, 8 pages.

* cited by examiner

VIRTUAL KEYBOARD BASED ACTIVATION AND DISMISSAL

CROSS REFERENCE TO RELATED APPLICATIONS

This application is a continuation of U.S. patent application Ser. No. 12/050,171, filed Mar. 18, 2008, entitled, VIRTUAL KEYBOARD BASED ACTIVATION AND DISMISSAL, the entire disclosure of which is herein incorporated by reference for all purposes.

BACKGROUND

Current virtual keyboards have layouts including key sizes and spacing which are not sufficiently adaptable to individual users. To overcome this issue, some virtual keyboards allocate reference keys of the virtual keyboards, for instance by detecting "F" and "J" key-strokes of a standard "QWERTY" keyboard based on finger touches, and the virtual keyboards then layout the remaining keys based on the positions of the reference keys. However, one drawback of such an approach is that it may not accurately size a virtual keyboard when finger touches are close together. For example, since finger touches may be grouped relatively close together for both users with long fingers and hands and users with short fingers and hands, such an approach may result in a virtual keyboard that is not appropriately sized for a user's finger and hand length.

SUMMARY

A virtual keyboard apparatus and method for forming the virtual keyboard apparatus are provided. The virtual keyboard apparatus may include a touch-sensitive display surface configured to detect a touch signal including at least a finger touch and a palm touch of a hand of a user, and a controller configured to generate a virtual keyboard having a layout determined based at least in part on a distance between the detected palm touch and the detected finger touch. The method for generating a virtual keyboard may include detecting with a touch-sensitive display surface a touch signal including at least a finger touch and a palm touch by a hand of a user, and generating a virtual keyboard having a layout based at least in part on a distance between the detected palm touch and the detected finger touch.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
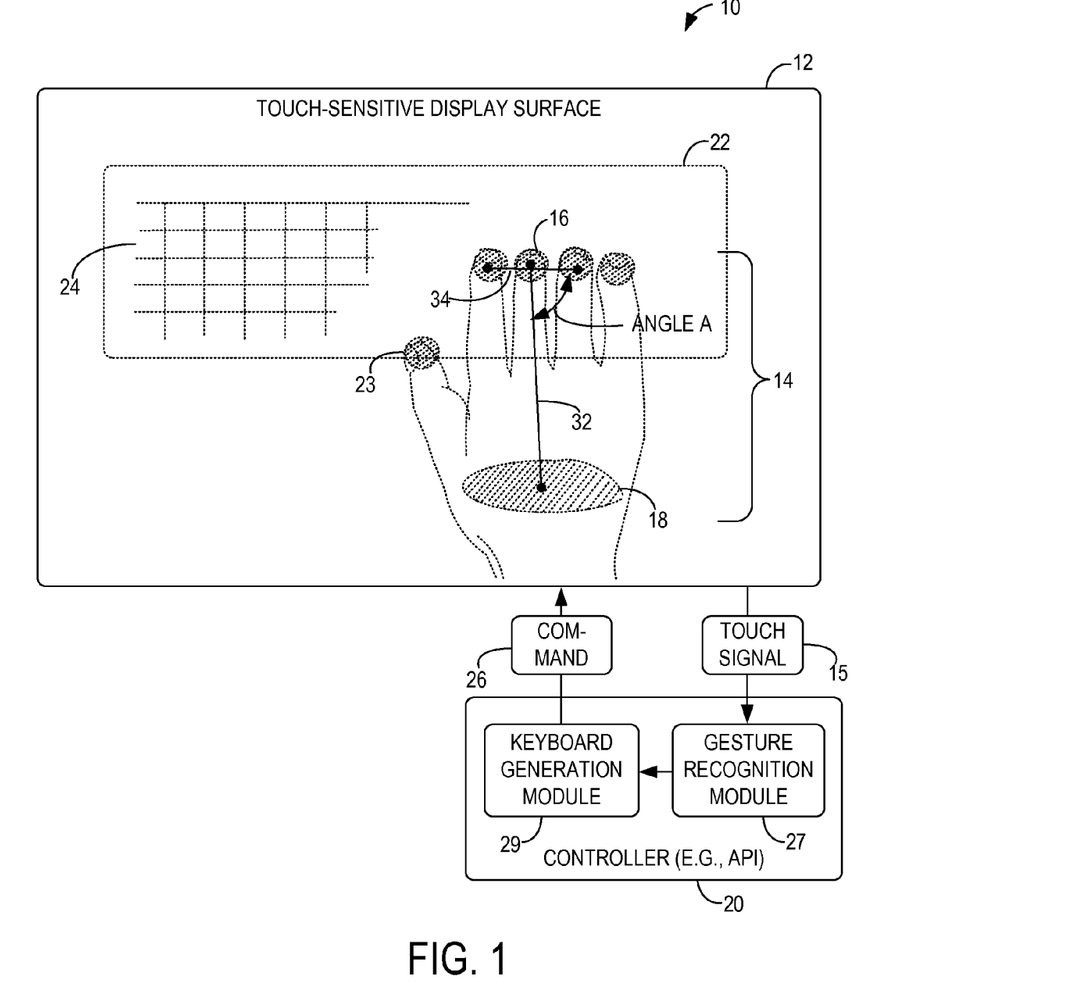
FIG. 1 is a schematic diagram of one embodiment of a virtual keyboard apparatus according to the present disclosure.

FIG. 1 is a schematic diagram of an example virtual keyboard apparatus 10 according to the present disclosure. The virtual keyboard apparatus 10 may include a touch-sensitive display surface 12 configured to detect a touch signal 15 indicating at least a finger touch 16 and a palm touch 18 of a hand of a user, and transmit the touch signal 15 to an associate controller 20. The controller 20 may be configured to process the touch signal 15 to generate a virtual keyboard 22 having a layout 24 determined at least in part on a distance of a palm-to-finger line 32 formed between the detected palm touch 18 and the detected finger touch 16, as described in detail below.

Referring now to specific details of the touch-sensitive display surface 12, the touch-sensitive display surface 12 may be a multi-touch display surface capable of detecting a plurality of touches at a given time, including position, size, and/or shape of each of the plurality of touches. The touch-sensitive display surface 12 may be configured to transmit a touch signal 15 to the controller 20, and may further be configured to display a virtual keyboard 22 generated by the controller 20 in response to receiving a command 26 from the controller 20 to display the virtual keyboard 22.

Referring now to specific details of the controller 20, the controller 20 may be in the form of computer software configured to be executed on a computing device coupled to the touch-sensitive display surface 12. In one example embodiment, the controller may be an application programming interface (API). The API may be a public API that is accessible both by an operating system of the virtual keyboard apparatus and by software of third party developers, or the API may be a private API that is accessible only by the operating system of the virtual keyboard apparatus. Alternatively, the controller 20 may be implanted as a computer program that is not part of an API, or may also be other suitable API's not listed herein.

In some embodiments, the controller 20 may include a gesture recognition module 27. The gesture recognition module 27 may be configured to receive the touch signal 15 from touch-sensitive display surface 12 and further process the touch signal 15 to determine whether the touch signal 15 includes a home row gesture 14. The controller 20 may further include a keyboard generation module 29 configured to generate the virtual keyboard 22 based on detecting the home row gesture 14 in the touch signal 15 received.

Referring now to specific details of the gesture recognition module 27, the gesture recognition module 27 may be configured to determine whether a home row gesture 14 is included in a detected touch signal 15. For example, the gesture recognition module 27 may determine a home row gesture 14 is included based at least in part on whether a touch signal 15 includes a predetermined collection of one or more palm touches 18 and one or more finger touches 16 forming the home row gesture 14.

In some embodiments, the predetermined collection of one or more palm touches 18 and one or more finger touches 16 forming a home row gesture 14 may include at least a palm touch 18, and a finger touch 16 formed by a hand of a user. Thumb touches 23 may also be used to detect the home row gesture 14. The gesture recognition module 27 may be configured to determine, based on touch position, size, shape, and/or relative positions, in particular relative to the palm touch 18, the type of touch that is detected. As examples, the gesture recognition module 27 may be configured to determine whether a touch is formed by a right hand or a left hand of a user, whether a touch is a palm touch 18 or a digit touch, whether a digit touch is a finger touch or a thumb touch, and/or whether a finger touch 16 is a index finger touch, a middle finger touch, a ring finger touch, or a pinky finger touch.

In one example, a home row gesture 14 may include a palm touch 18 and two finger touches 16 of a hand of a user. In yet another example, a home row gesture 14 may include a palm touch 18 and three finger touches 16 of a hand of a user. In still another example, the home row gesture 14 may include a palm touch 18 and four finger touches 16 of a hand of user of a user. In yet another example, the home row gesture 14 may include a palm touch 18 and a finger touch 16 of each hand of a user. In yet another example, the home row gesture 14 may include a palm touch 18 and two finger touches 16 of each hand of a user. In yet another example, the home row gesture 14 may include a palm touch 18 and three finger touches 16 of each hand of a user. In yet another example, the home row gesture 14 may include a palm touch 18 and all four finger touches 16 of each hand of a user. Other touch combinations are within the scope of this disclosure.

The finger touches 16 included for forming the home row gesture 14 may be any finger touches 16 of a user, or alternatively may be selected from a selected group of finger touches 16 of a user in other examples. For example, the finger touch (es) 16 may be selected from index finger touch(es), middle finger touch(es), and ring finger touch(es) of a user, since the positions of these finger touches are relatively constant in relation to each other and to a palm touch 18 formed by the same hand. In one specific example, the home row gesture 14 may include a palm touch 18, and a finger touch 16 selected from any one of the index finger touch, middle finger touch, and ring finger touch of a hand of the user. In another specific example, the home row gesture 14 may include a palm touch 18, index finger touch, middle finger touch, and ring finger touch of each hand of a user. In yet another example, the home row gesture 14 may include a palm touch 18, thumb touch, index finger touch, middle finger touch, ring finger touch, and pinky finger touch of each hand of a user.

Furthermore, the gesture recognition module 27 may be further configured to determine whether the home row gesture 14 is included in the detected touch signal 15 based further on whether the collection of one or more palm touches 18 and one or more finger touches 16 forming the home row gesture 14 have persisted for at least a predetermined amount of time set for forming the home row gesture 14. The predetermined period of time for forming the home row gesture 14 may be, for example, between 1 and 5 seconds, or longer or shorter as desired, and may be set by software default or adjusted by the user.

Referring now to specific details of the keyboard generation module 29. The keyboard generation module 29 may be configured to determine the layout 24 of the virtual keyboard 22 based on at least in part on a distance of a palm-to-finger line 32 formed between a detected palm touch 18 and a detected finger touch 16 of a hand of a user forming the home row gesture 14.

In some examples, the detected home row gesture 14 may include a finger touch 16 and a palm touch 18 of a first hand, and a finger touch 16 and a palm touch 18 of an opposing hand, the keyboard generation module 29 may be configured to determine the layout 24 of the virtual keyboard 22 further based on a distance of a palm-to-finger line 32 between the detected palm touch 18 and the detected finger touch 16 of the opposing hand of the user.

In some examples, the detected home row gesture 14 may include a palm touch 18, a first finger touch 16 and a second finger touch 16 formed by a hand of a user. The first finger touch 16 and the second finger touch 16 may in some examples be selected from the group consisting of index finger touch, middle finger touch, and ring finger touch of the hand of the user. The keyboard generation module 29 may measure an angle A formed between a palm-to-finger line 32 and a finger-to-finger line 34, wherein the palm-to-finger line 32 connects the detected finger touch 16 and the detected palm touch 18, and wherein the finger-to-finger line 34 connects respective finger touches 16 detected by the touch-sensitive display surface 12, and generate the virtual keyboard 22 with the layout 24 that is further based on the measured angle.

The keyboard generation module 29 may be further configured to measure a distance of the finger-to-finger line 34 and generate the virtual keyboard 22 with the layout 24 that is further based on the distance of the finger-to-finger line 34.

The keyboard generation module 29 may be configured to determine a curvature of the virtual keyboard 22 based on line(s) fitted over two or more detected finger touches 16 of a user.

The keyboard generation module 29 may be configured to generate a split virtual keyboard with a left-hand section and a right-hand section. The keyboard generation module may be configured to separately determine a layout of the each of the sections.

Figure 3:
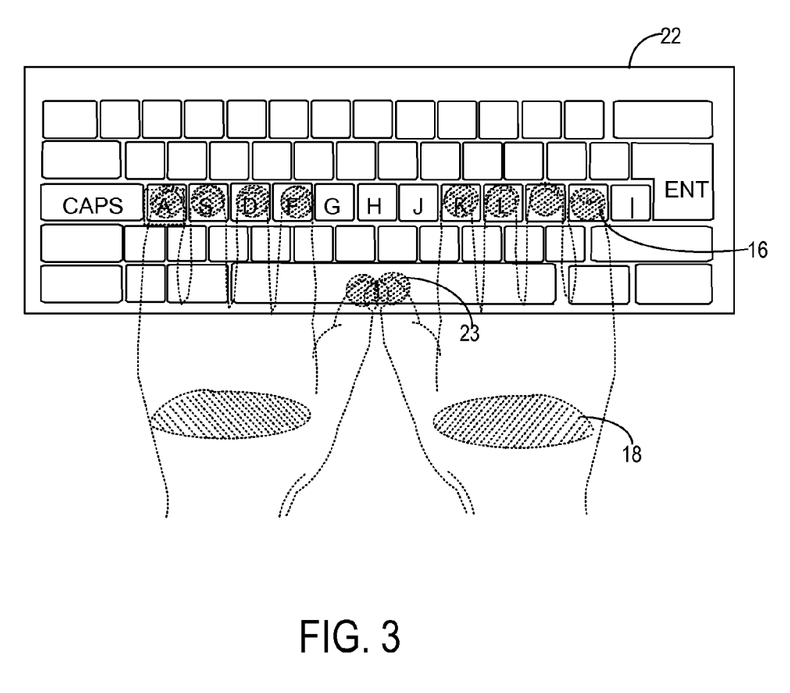
FIG. 3 is a schematic diagram illustrating forming the virtual keyboard of FIG. 1 over detected finger touches of two hands of a user.

The keyboard generation module 29 may be configured to generate a command 26 that causes the virtual keyboard 22 to be positioned over the detected finger touches 16, for example and as shown in FIG. 3, with a home row of the virtual keyboard (e.g., "ASDFGHJKL:/;") laid over the detected finger touches 16. The keyboard generation module 29 may cause the virtual keyboard 22 to be displayed on the touch-sensitive display surface 12.

Referring now back to the gesture recognition module 27, the gesture recognition module 27 may be further configured to detect a dismissal gesture. The controller 20 may be configured to dismiss the virtual keyboard 22 based on the detected dismissal gesture.

The dismissal gesture may be formed by simultaneously dragging a pair of opposing hands across the touch-sensitive display surface 12. In one example, the dismissal gesture may be formed by simultaneously dragging a pair of opposing hands in opposite directions across the touch-sensitive display surface 12. A predetermined amount of time and/or distance may be set for the hands to move across the touch-sensitive display surface 12 before the dismissal gesture may be detected.

Figure 2:
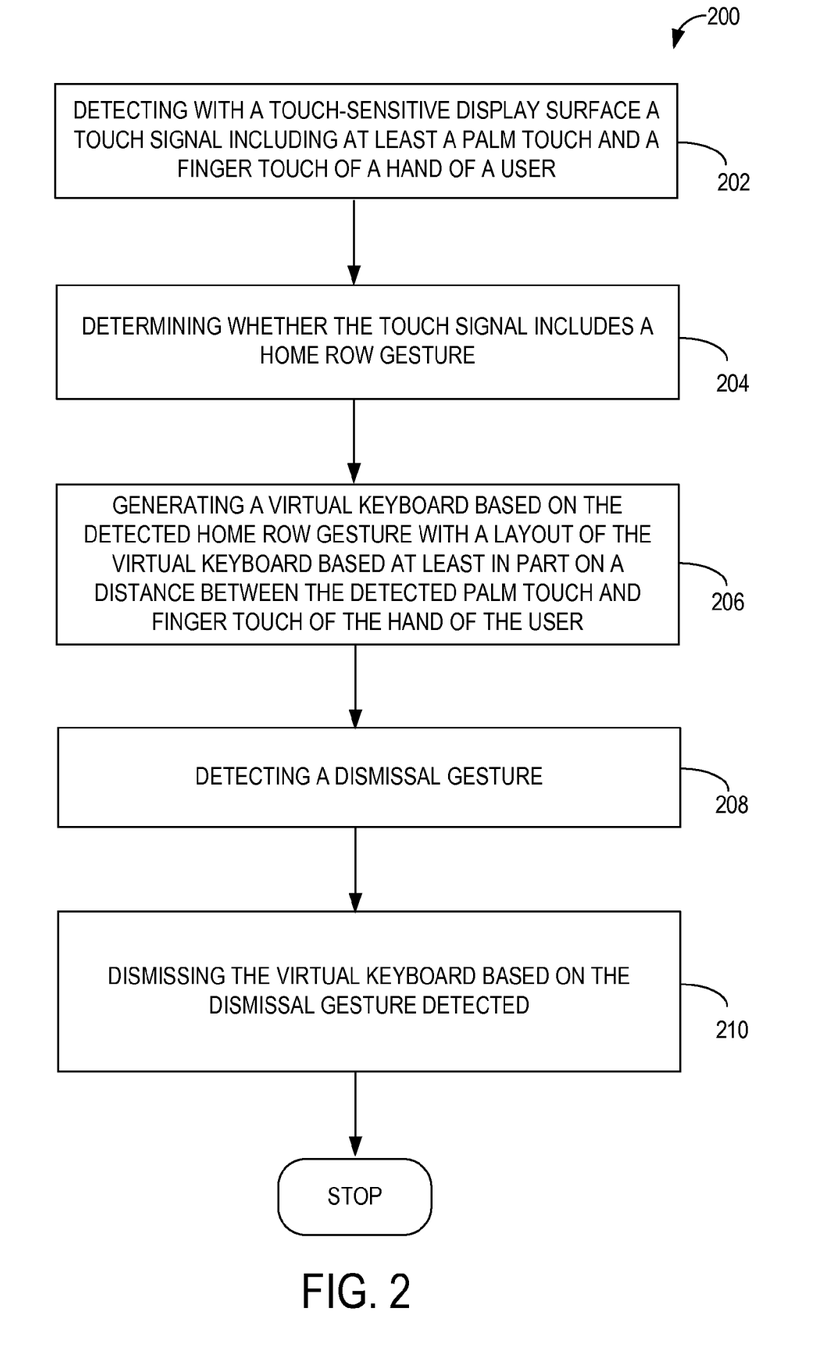
FIG. 2 is a flowchart of an example method for generating a virtual keyboard apparatus according to the present disclosure.

FIG. 2 is a flowchart of an example method 200 for generating a virtual keyboard which may be implemented in the virtual keyboard apparatus 10 of FIG. 1.

At 202, the method 200 may comprise detecting a touch signal with a touch sensitive display surface. The touch signal may include at least a finger touch and a palm touch formed by a hand of a user. The touch signal may include additional finger touch(es) or thumb touch(es) formed by the same hand or an opposing hand, and/or a palm touch formed by the opposing hand.

At 204, method 200 then comprises determining whether the touch signal includes a home row gesture. The determination may be based at least in part on whether the touch signal includes a predetermined collection of one or more palm touches and one or more finger touches forming the home row gesture, the predetermined collection may include the detected palm touch and the detected finger touch. The determination may further be based on determining whether a touch signal includes thumb touch(es) for forming the home row gesture.

Furthermore, the determination of whether the home row gesture is included in the touch signal may include determining whether the collection of one or more palm touches and one or more finger touches forming the home row gesture have persisted for at least a predetermined amount of time set for forming the home row gesture.

The finger touches and/or thumb touches for forming the home row gesture may be touches formed by all digits (thumbs/fingers) or restricted to touches formed by selected digits (thumbs/fingers) of a user. Embodiments may be restricted to touches formed by selected digits to decrease variability of a home row gesture. For example, by being restricted to index finger touches, middle finger touches, and ring finger touches of a hand, a home row gesture may be more easily determined since the positions of these finger touches are relatively more consistent in relation to palm touch of the same hand.

In one specific example, a home row gesture may include a palm touch, and any one of an index finger touch, middle finger touch, and ring finger touch of a hand of the user. In another example, the home row gesture may include a palm touch, index finger touch, middle finger touch, and/or a ring finger touch of each hand of a user. In yet another example, the home row gesture may include palm touch, thumb touch, index finger touch, middle finger touch, ring finger touch, and a pinky finger touch of each hand of a user.

The type of a touch detected may be determined based on the position, size, and shape of the touch, and/or the relative position to other touches, and in particular in relation to a palm touch. For example, a touch can be determined to be a palm touch or a finger touch, and if the touch is a finger touch, the touch may be an index finger touch, middle finger touch, ring finger touch, or a pinky finger touch, etc. In this manner, a determination whether a home row gesture is included in a touch signal may then include first identifying and locating palm touch(es) based on the shape and size of the palm touch(es), and then identifying and locating individual finger touches based on the shape, size, and relative locations to the identified palm touch(es) of the individual finger touches.

At 206, the method 200 may include generating a virtual keyboard based on the detected home row gesture, the virtual keyboard having a layout based on at least in part on a distance if a palm-to-finger line formed between a detected palm touch and a detected finger touch of a hand of user for forming the home row gesture.

In some examples, the detected home row gesture may include a finger touch and a palm touch of a first hand, and a finger touch and a palm touch of an opposing hand. Additionally, the layout of the virtual keyboard may be further based on a distance of a palm-to-finger line between the detected palm touch and the detected finger touch of the opposing hand of the user.

In some examples, a detected home row gesture may include a palm touch, a first finger touch and a second finger touch formed by a hand of a user. The first finger touch and the second finger touch may be selected from the group consisting of index finger touch, middle finger touch, and ring finger touch of the hand of the user. The method 200 may further measure an angle formed between a palm-to-finger line and a finger-to-finger line, wherein the palm-to-finger line connects the detected finger touch and the detected palm touch, and wherein the finger-to-finger line connects respective finger touches detected by the touch sensitive display surface, and generate the virtual keyboard with a layout that is further based on the measured angle. The method 200 may further measure a distance of the finger-to-finger line and generate a virtual keyboard with a layout based on the distance of the finger-to-finger line.

The method may further include determining a curvature of the virtual keyboard based on line(s) fitted over two or more detected finger touches of a user. In some embodiments, a keyboard may be generated with a split virtual keyboard with a left-hand section and a right-hand section. In some embodiments, a keyboard may be generated by separately determining a layout of the each of the sections.

The method may further include positioning the virtual keyboard over detected finger touches. As shown in FIG. 3, a home row of the virtual keyboard (e.g., "ASDFGHJKL:/;") may be positioned based on the detected finger touches, for example over the detected finger touches. The virtual keyboard 22 may also be displayed on the touch-sensitive display surface 12, as depicted in FIG. 1.

In some examples, the method 200 may include forming a virtual keyboard in a left-hand section and a right-hand section, and positioning the left-hand section over finger touches formed by a left hand of a user and positioning the right-hand section over finger touches formed by a right hand of a user. Further, layouts of each section of a virtual keyboard may be separately determined based on other distances and/or angles formed among detected finger touch(es) and palm touch(es) formed by a corresponding hand of the user, in similar to other examples discussed herein.

At 208, the method 200 may include detecting a dismissal gesture. In one example, a dismissal gesture may be formed by simultaneously dragging a pair of opposing hands across a touch-sensitive display surface. In another example, the dismissal gesture may be formed by simultaneously dragging a pair of opposing hands in opposite directions across the touch-sensitive display surface. In yet another example, a predetermined amount of time and/or distance may be set for the hands to move across the touch-sensitive display surface before a dismissal gesture may be detected. Next, at block 210, the method 200 may include dismissing a virtual keyboard based on the detected dismissal gesture.

FIG. 3 illustrates forming a virtual keyboard 22 over detected finger touches 16 of a home row gesture 14 according to the present disclosure. In this example, a home row gesture 14 may include a palm touch 18 and finger touches 16 of all fingers of each hand of a user. In some embodiments, the virtual keyboard 22 may be formed over the finger touches 16, so that a home row of the virtual keyboard ("ASDFGHJKL:/;) may be formed over the detected finger touches 16, and the space bar may be positioned over detected thumb touches 18.

Figure 4:
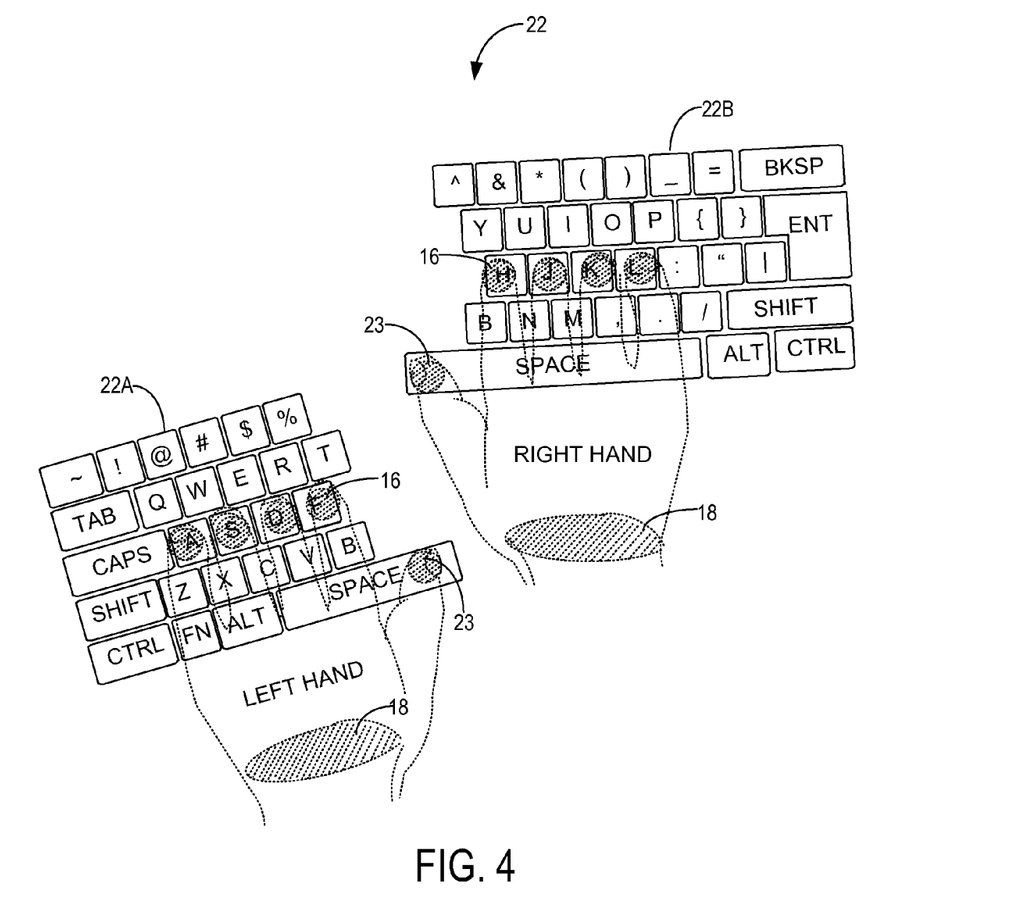
FIG. 4 is a schematic diagram illustrating forming the virtual keyboard of FIG. 1 into a left-hand section and a right-hand section at different orientations.

FIG. 4 illustrates a virtual keyboard 22 may be formed in a left-hand section 22A and a right-hand section 22B. For example, a virtual keyboard 22 may be formed with the left-hand section 22A formed over finger touches 16 of a left hand of a user and the right-hand section 22B formed over finger touches 16 of a right hand of the user. A layout 24 of each of the sections may be determined based on a palm touch 18 and finger touch(es) 16 detected for a corresponding hand of the user.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A virtual keyboard apparatus, comprising:
    a touch-sensitive display surface configured to detect a touch signal including at least a finger touch and a palm touch by a hand of a user, and a virtual keyboard with a plurality of customized layouts; and
    a controller configured to generate a virtual keyboard with one of the customized layouts customized layout determined based at least in part on a distance between the detected palm touch and the detected finger touch.

2. The virtual keyboard apparatus of claim 1, wherein the controller is further configured to determine a curvature of the virtual keyboard based on a line fitted over the finger touch and at least one more detected finger touch of the user.

3. The virtual keyboard apparatus of claim 1,
    wherein the controller is further configured to determine whether a home row gesture is included in the detected touch signal, based at least in part on whether the touch signal includes a predetermined collection of one or more palm touches and one or more finger touches forming the home row gesture, the predetermined collection including the detected palm touch and the detected finger touch, and wherein the controller is further configured to generate the virtual keyboard based on detecting the home row gesture; and
    wherein the controller is further configured to determine whether the home row gesture is included in the detected touch signal, based further on whether the collection of one or more palm touches and one or more finger touches forming the home row gesture have persisted for at least a predetermined amount of time set for forming the home row gesture.

4. The virtual keyboard apparatus of claim 3,
    wherein the finger touch is a finger touch of a first hand and the palm touch is a palm touch of a first hand;
    wherein the detected home row gesture further includes a palm touch and a finger touch of an opposing hand of the user; and
    wherein the layout of the virtual keyboard is further based on a distance between the detected palm touch and the detected finger touch of the opposing hand of the user.

5. The virtual keyboard apparatus of claim 1, wherein the controller is configured to:
    measure an angle formed between a palm-to-finger line and a finger-to-finger line, wherein the palm-to-finger line connects the detected finger touch and the detected palm touch, and wherein the finger-to-finger line connects respective finger touches detected by the touch sensitive display surface; and
    generate the virtual keyboard with the layout that is further based on the measured angle.

6. The virtual keyboard apparatus of claim 5, wherein the layout of the virtual keyboard is further determined based on a distance of the finger-to-finger line.

7. The virtual keyboard apparatus of claim 5, wherein the respective finger touches of the finger-to-finger line are finger touches selected from the group consisting of an index finger touch, middle finger touch, and ring finger touch of the hand.

8. The virtual keyboard apparatus of claim 1, wherein the controller is configured to position the virtual keyboard over the detected finger touch.

9. The virtual keyboard apparatus of claim 1,
    wherein the touch-sensitive display surface is configured to detect a dismissal gesture; and
    wherein the controller is configured to dismiss the virtual keyboard based on the detected dismissal gesture.

10. The virtual keyboard apparatus of claim 9, wherein the detected dismissal gesture is formed by simultaneously dragging a pair of opposing hands of a user across the touch-sensitive display surface.

11. A method for generating a virtual keyboard, comprising:
    detecting with a touch-sensitive display surface a touch signal including at least a finger touch and a palm touch formed by a hand of a user, and a virtual keyboard with a plurality of customized layouts; and
    generating a virtual keyboard with one of the customized layouts customized layout based at least in part on a distance between the detected palm touch and the detected finger touch.

12. The method of claim 11, further comprising:
    determining a curvature of the virtual keyboard based on a line fitted over the finger touch and at least one more detected finger touch of the user.

13. The method of claim 11, further comprising:
    determining whether a home row gesture is included in the detected touch signal, based at least in part on whether the touch signal includes a predetermined collection of one or more palm touches and one or more finger touches forming the home row gesture, the predetermined collection including the detected palm touch and the detected finger touch, and wherein generating the virtual keyboard is based on detecting the home row gesture;
    wherein determining whether the home row gesture is included in the touch signal further includes determining whether the collection of one or more palm touches and one or more finger touches forming the home row gesture have persisted for at least a predetermined amount of time set for forming the home row gesture.

14. The method of claim 13,
    wherein the finger touch and the palm touch are a finger touch and a palm touch of a first hand of the user;
    wherein the detected home row gesture further includes a palm touch and a finger touch of an opposing hand of the user; and
    wherein the layout of the virtual keyboard is further based on a distance between the detected palm touch and finger touch of the opposing hand of the user.

15. The method of claim 11, further comprising:
    measuring an angle formed between a palm-to-finger line and a finger-to-finger line, wherein the palm-to-finger line connects the detected finger touch and the detected palm touch, and wherein the finger-to-finger line connects respective finger touches detected by the touch sensitive display surface; and generating the virtual keyboard with the layout that is further based on the measured angle.

16. The method of claim 11, further comprising:

generating the virtual keyboard with the layout that is further based on a distance of the finger-to-finger line.

17. The method of claim 16, wherein the respective finger touches of the finger-to-finger line are finger touches selected from the group consisting of an index finger touch, middle finger touch, and ring finger touch of the hand.

18. The method of claim 11, further comprising:

detecting a dismissal gesture with the touch-sensitive display surface; and dismissing the virtual keyboard based on the detected dismissal gesture.

19. The method of claim 18, wherein the detected dismissal gesture is formed by simultaneously dragging a pair of opposing hands of a user across the touch-sensitive display surface.

* * * * *